May 12, 1959    R. G. HEYL, JR    2,886,095
LONGITUDINALLY ADJUSTABLE SEAT TRACK
Filed May 9, 1956
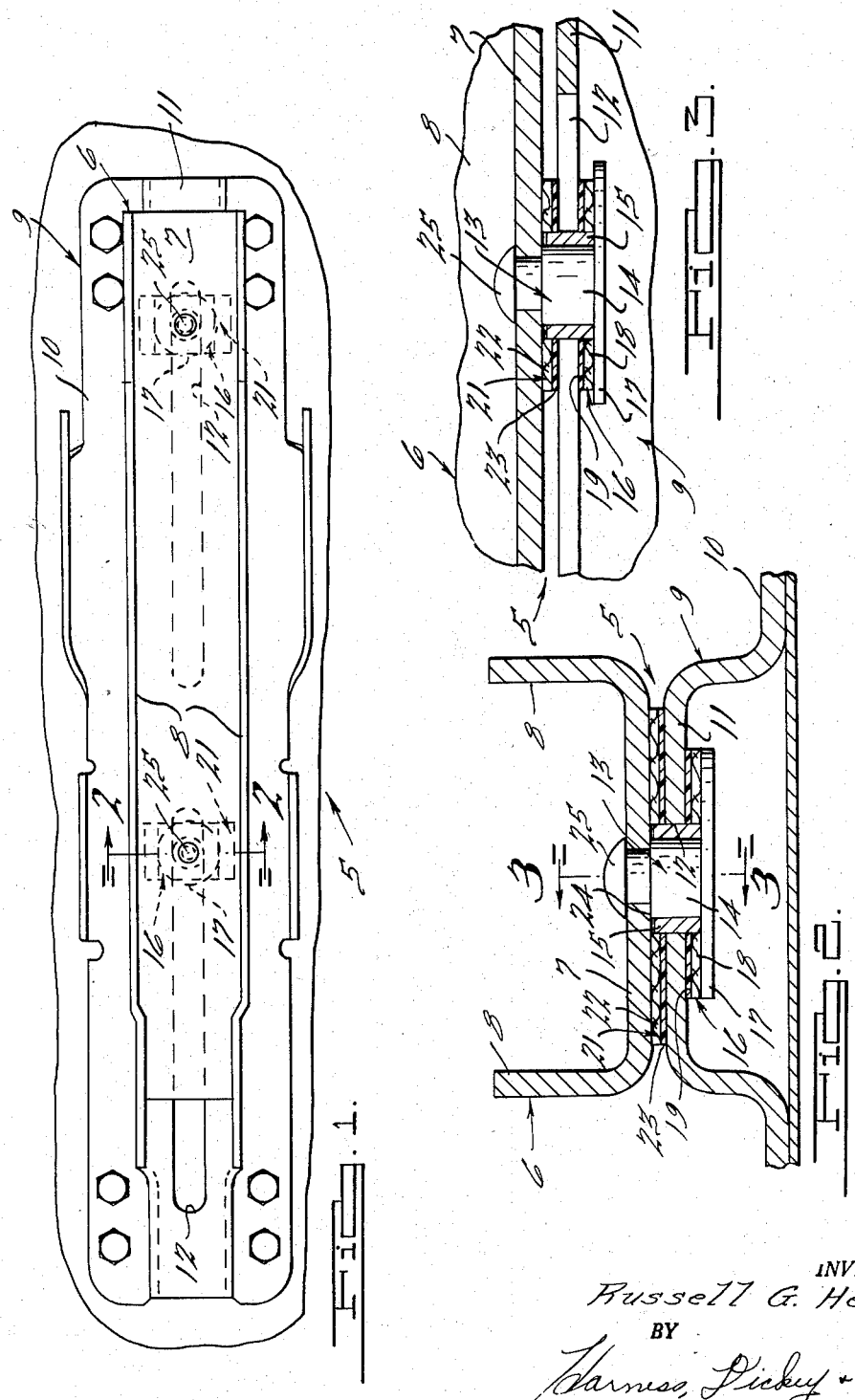
INVENTOR.
Russell G. Heyl, Jr.
BY
Harness, Dickey & Pierce.
ATTORNEYS.

United States Patent Office 2,886,095
Patented May 12, 1959

2,886,095
LONGITUDINALLY ADJUSTABLE SEAT TRACK

Russell G. Heyl, Jr., Birmingham, Mich., assignor to American Metal Products Company, Detroit, Mich., a corporation of Michigan Application May 9, 1956, Serial No. 583,654

1 Claim. (Cl. 155—14)

This invention relates to seat tracks, and particularly to a longitudinally adjustable seat track having low friction characteristics and maximum stability.

It has been the practice in the art to construct horizontally adjustable seat tracks from two parts having balls therebetween to reduce the friction required for adjustment. The use of raceways and balls added to the height of the resulting seat track, and dirt and grime collecting in the bottom raceways increased the effort required to produce the adjustment. The present seat track embodies two members, both of which are preferably channel shaped to provide strength with the use of material of minimum gauge, the one being attachable to the floor and the other supporting the seat. The webs of the channel element are disposed adjacent to each other and are separated by a washer having a face of low friction material. A headed rivet is employed for securing the webs together, a shoulder portion being provided for limiting the compression of the washer between the webs and a similar washer between the head of the rivet and the opposite face of the web, so that both sides of the web are engaged by a low friction material.

In the track herein illustrated, a pair of the slots is provided in one of the supporting members, and a rivet in each of the slots retains the faces of the low friction material against the opposite surfaces of the opposite web. The washers having the frictionless material are preferably constructed from a base material of resin which may be in sheet or mascerated form, having a surface bonded, woven or otherwise secured thereto of fluorocarbon resin, such as Teflon. The Teflon material has extremely low friction characteristics and forms a desirable face for engaging the opposite surfaces of the web of one of the supporting members.

Accordingly, the main objects of the invention are: to form a seat track from a pair of members having adjacent flat webs, with one of the members having a slot and the other member having a rivet secured thereto which extends through the slot and secures low friction faces of washers on the rivet against the opposite surfaces of one of the slotted members; to provide a low stable seat track constructed from a pair of oppositely presenting channel elements, the webs of which are spaced apart by a pair of washers having a face of low friction material engaging the web of one member which has a pair of elongated slots therein through which headed rivets extend which have a washer thereon provided with a low friction face engaging the opposite side of the member with a predetermined pressure when the rivet is secured to the other member; to provide a stable seat track which is longitudinally adjustable, constructed from a pair of flat members one having a slot therein through which a headed rivet extends for securing the other member thereto, with a pair of low friction resin washers in clamped relation to opposite sides of the slotted member, and, in general, to provide a seat track for adjustably supporting a seat which is simple in construction, positive in operation, and economical of manufacture.

Other objects and features of novelty of the invention will be specifically pointed out or will become apparent when referring, for a better understanding of the invention, to the following description, taken in conjunction with the accompanying drawing, wherein:

Figure 1 is a plan view of a seat track embodying features of the present invention;

Fig. 2 is an enlarged, broken sectional view of the structure illustrated in Fig. 1, taken on the line 2—2 thereof, and Fig. 3 is an enlarged, broken sectional view of the structure illustrated in Fig. 1, taken on the line 3—3 thereof.

In the drawing, a seat track 5 is illustrated, two of which are employed to support a seat. Each track comprises a seat supporting member 6 of channel section having a horizontal web 7 and upwardly extending arms 8 to which one side of the seat is secured. A base member 9 of inverted channel section has edge flanges 10 which are secured to the floor of the vehicle. The web 11 of the member 9 has a pair of spaced elongated slots 12 through which a pair of headed rivets 13 are employed for securing the webs 7 and 11 in operating relation to each other. The body 14 of each rivet has a hardened metal sleeve 15 secured thereover, the diameter of which is slightly less than the width of the slot 12 in which it operates. A washer 16 is supported against the head 17 of the rivet, having a backing portion 18 to which a low friction face 19 is secured. A washer 21, herein illustrated as of rectangular shape to engage a greater width of the web 11, has a body 22 to which a face 23 of low friction resin material is secured. The washer 21 is mounted over the sleeve 15 with its face 23 of low friction material engaging the top surface of the web 11 of the base member 9. The low friction face 18 of the washer 16 abuts the under surface of the web 11, retained in engagement therewith by the rivet head 17. The rivet 13 has a shoulder 24 on the end opposite to that having the head 17 which engages the under surface of the web 7 of the base member 6 and limits the pressure applied between the low friction faces 19 and 23 and the opposite surfaces of the web 11 when the web 7 is secured against the shoulder 24 of the rivet when the end is swaged to form a head 25.

The washers 16 and 21 may be constructed in any manner, preferably from woven and built-up materials, as disclosed, described and claimed in the copending applications of C. S. White, Serial No. 544,945, filed November 4, 1955, now Patent No. 2,804,886 for Low Friction Fabric Material, and C. S. White, Serial No. 583,656, filed May 9, 1956, for Barrier and Bonding Material for Low Friction Surface, under which the assignee of the present invention is an exclusive licensee.

When employing the disclosures of any of the applications, washers are provided which have a base portion to which a face of low friction resin material, preferably of the fluorocarbon type, such as Teflon, is secured by direct bonding or by weaving and bonding, according to the disclosures of the above mentioned applications. The Teflon material has extremely low friction engagement with the opposite faces of the web 11. When the rough portions and burrs are removed from the slot with which the sleeves 15 engage, extreme rigidity against tilting is provided while permitting the longitudinal adjustment of the seat supporting member relative to the base member without any substantial effort. The required force of adjustment will remain uniform throughout the life of the track as any dirt or grime collecting between the webs 7 and 11 will be brushed off each time the adjustment is made. The tracks are employed in pairs, one on each side of a seat and may be combined with vertically adjustable mechanisms, as disclosed in the copending application of R. I. Homier, Serial No. 662,611, filed May 31, 1957, for Multiple Position Seat Track, and assigned to the assignee of the present invention.

The seat track, being of shallow depth, is extremely useful in future model automobiles, as the seats are being lowered closer to the floor to permit a reduction in the over-all height of the automobile. The clamping of the low friction resin surfaces of the washers against the web of a track member provides stability while permitting adjustment with a minimum of effort. The track may be employed for horizontal adjustment only but it has a great or greater usefulness when combined with mechanism which adjusts the seat vertically.

What is claimed is:

A seat track made up of a seat supporting member and a base engaging member having web portions disposed adjacent to each other, one of said web portions being provided with an elongated slot, a rivet having a body with a head on one end and a shoulder on the other end extending through said slot and rigidly secured to the web portion of the other member, a pair of washers engaging the opposite sides of said one web portion, said washers having low friction resin material on their web engaging faces only and having apertures through which said rivet extends, said rivet providing a predetermined pressure between the web and the low friction resin surfaces of the washers, and a freely rotatable sleeve extending over said rivet and being of a length less than the rivet body between the head and shoulder end.

References Cited in the file of this patent

UNITED STATES PATENTS

| | | |
|---|---|---|
| 1,773,875 | Seely | Aug. 26, 1930 |
| 1,921,224 | Floraday | Aug. 8, 1933 |
| 2,235,904 | Schulz | Mar. 25, 1941 |
| 2,272,536 | Votypka | Feb. 10, 1942 |
| 2,479,653 | Walter | Aug. 23, 1949 |
| 2,622,949 | Cotchett | Dec. 23, 1952 |